Jan. 20, 1942. E. H. RUPPERT ET AL 2,270,641
COLD WATER INJECTOR FOR HOT WATER SUPPLY PIPES
Filed July 8, 1938

INVENTOR.
Edward H. Ruppert and
George H. Lippincott
H. Lee Helms
ATTORNEY.

Patented Jan. 20, 1942

2,270,641

UNITED STATES PATENT OFFICE 2,270,641

COLD WATER INJECTOR FOR HOT WATER SUPPLY PIPES

Edward H. Ruppert, Brooklyn, and George H. Lippincott, New York, N. Y.

Application July 8, 1938, Serial No. 218,116

1 Claim. (Cl. 236—99)

The object of the present invention is to provide an automatic device which will directly inject into a hot water supply pipe a proportion of cold water dependent upon a predetermined temperature of the water passing through the supply pipe and in such manner that the use of a mixing chamber and also the use of a thermostatic element within such chamber or, in other respects subjected directly to surface contact with the hot water, is avoided.

The device is inexpensive, simple in construction, and may be quickly applied to existing hot water systems, as, for example, to the hot water supply pipe leading from a hot water tank and to the cold water inlet pipe leading to such tank.

Further objects of the invention will hereinafter appear with reference to the accompanying drawing, in which.

Figure 1:
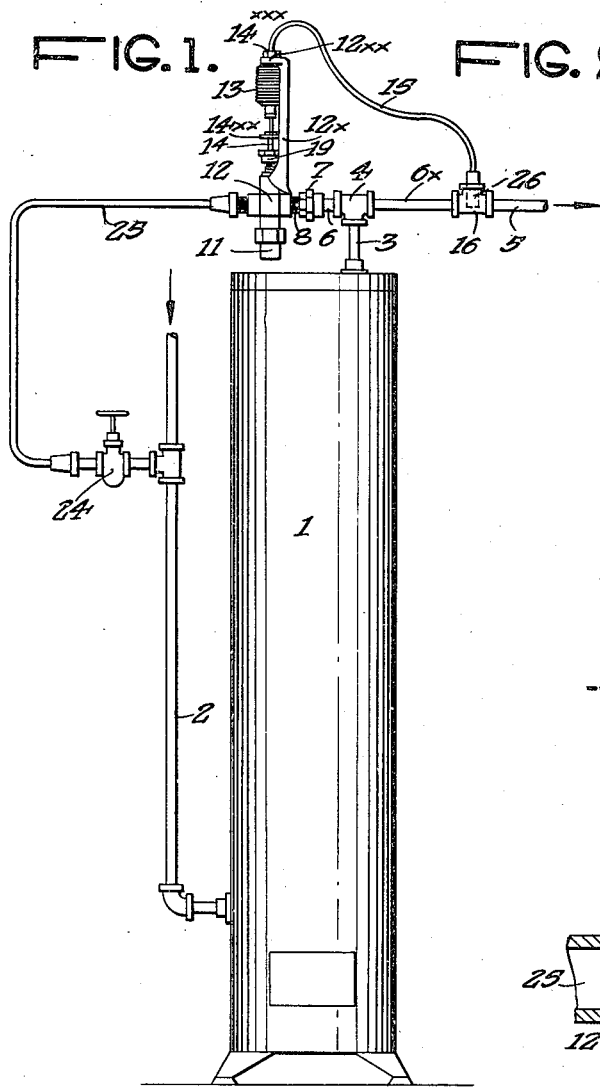
Figure 1 is a view in elevation showing an embodiment of the invention applied to a hot water tank.

In the drawing we have shown a hot water tank at 1 to which may be led cold water via the pipe 2. At the top of the tank is the usual hot water outlet pipe 3 connected by a T-head 4 with supply pipe 5 leading to the usual household hot water faucet system.

Connected at the side of the T-head opposite pipe 5 is a short pipe 6 to which is secured, as by coupling 7, an injection pipe 8 which carries the injector. The injector comprises a tubular base member having a cylindrical aperture which receives slide valve 9. The valve is normally held in open position, receiving the light tension of a coil spring 10 held in position by a base closure cap 11 threaded at the end of the tubular valve casing 12.

Preferably formed integral with tubular valve casing 12 is a bracket arm 12x having a transversely bent end member 12xx. Member 12xx is formed with a threaded aperture through which is passed the threaded stem of an expansion bellows 13, the latter being secured in position by nut 14. Through the threaded stem of bellows 13 passes a flexible conduit 15 leading to a hollow coupling 16 which receives outflow pipe 9 and pipe 6x which is immediately connected to T-head 4. The inner end of the bellows carries a hollow internally threaded head 13x which receives a stem 14, the latter carrying a thumb wheel 14xx. Above the thumb wheel may be positioned a holding nut 17. The connector passes downwardly through a packing gland member 18, the packing being held in position by a cap 19 threaded on the gland member.

At its lower end the connector passes through the central aperture of a plural apertured web 20 carried by sleeve valve 9 at its upper end, a nut 21 holding the said parts in connected position. When lock nut 14x is loosened thumb wheel 16 may be rotated to adjust the position of the sleeve valve relatively to the bellows 13.

The sleeve valve 9 is formed with opposed ports a and b with a longitudinally extending slot 22 which receives a guide pin 23 carried by member 12, so that the sleeve valve is restrained against rotation.

To the cold water intake pipe 2 is connected via control valve 24 a cold water pipe 25 which is threaded into the injector opposite port a of the sleeve valve.

It will be understood that at the end of flexible pipe conduit 15 will be disposed a thermo cup 26 containing a suitable liquid, which liquid will also be contained in the tube itself and in the bellows.

Figure 2:
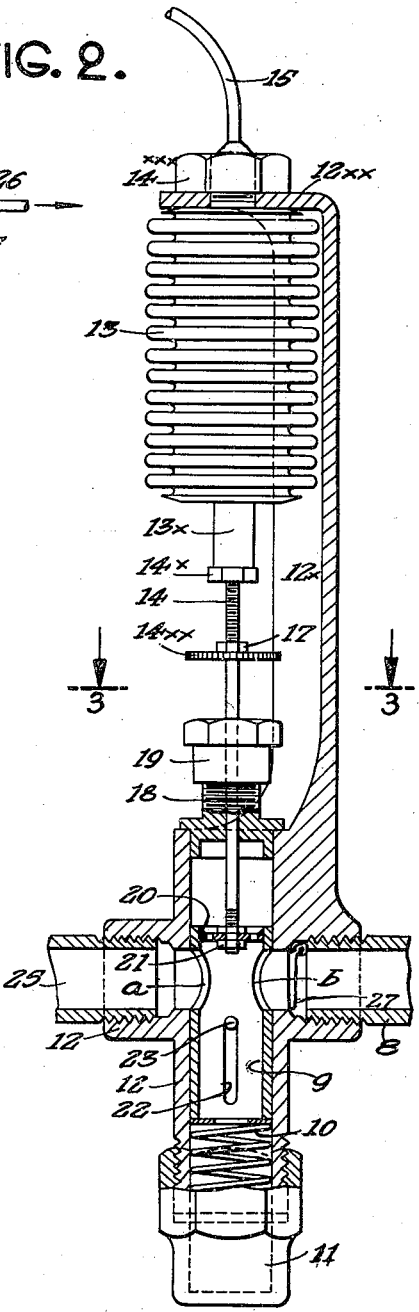
Figure 2 is an enlarged elevation, partly in section, showing the primary operating member.
Figure 3:
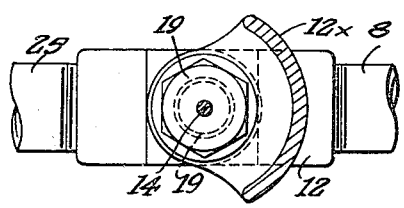
Figure 3 is a horizontal section on the line 3—3, Figure 2.

In the position of the parts illustrated in Figure 2, the hot water flowing through connected pipes 5, 6x, has exceeded in temperature a predetermined minimum and therefore expansion of the liquid in thermo cup 26 has caused the bellows to move the sleeve valve 9 downwardly against the tension of spring 10, thus opening the valve so that cold water will be directly injected through ports a and b into the hot water outflow pipe 6x. This action will continue until the temperature of the hot water passing through the outflow pipes has been reduced to a desired degree, whereupon the expansible liquid will contract and the bellows will contract, aided by the pressure of spring 10, reducing the injection of cold water and finally shutting off said injection should the temperature of the outgoing hot water reach the minimum.

It will be understood that the device may be positioned horizontally or at an angle relatively to its position shown in Figure 1, and that in either case the device is adapted to directly pass cold water into the hot water outflow conduit so that only the hot water drawn off for immediate use is affected and the device, therefore, is economical and efficient whilst avoiding the direct subjection of the thermal control to the water flow.

Temperature regulation of the outflow hot water may conveniently and quickly be secured through operation of the thumb wheel 14xx which will vary the position of the sleeve valve 9 relatively the position of the unit 13, 13x.

It will be seen that hot water cannot back into the cold water line, this action being stopped by flap valve 27.

Having described our invention, what we claim and desire to secure by Letters Patent, is as follows:

In cold water injectors and in combination with a sleeve valve, a thermal expansible device, and an adjustable connection between said device and the sleeve valve, of a valve casing comprising a unitary metallic member having at one end a head formed with two cylindrical bores extending through the head, the first bore having its direction substantially at right angles to the second bore, and a sleeve valve disposed in the second bore, the ends of the first bore being adapted for receiving and holding an inlet and an outlet pipe, a closure cap for one end of the second bore and a packing closure cap in the opposite end of the second bore, a rigid arm integrally extending outwardly from the head and substantially parallel with the second bore, the thermal expansible device being of the bellows-type and having one end held fixedly to said rigid arm at one end thereof and having its opposite end connected to the sleeve valve by means of a threaded and adjustable connection.

EDWARD H. RUPPERT.
GEORGE H. LIPPINCOTT.